H. C. SHAW.
MECHANICAL MOVEMENT.
APPLICATION FILED NOV. 14, 1910.

1,004,918.

Patented Oct. 3, 1911.

2 SHEETS—SHEET 1.

WITNESSES

INVENTOR
H. C. Shaw
by F. N. Barber
attorney

H. C. SHAW.
MECHANICAL MOVEMENT.
APPLICATION FILED NOV. 14, 1910.

1,004,918.

Patented Oct. 3, 1911.

2 SHEETS—SHEET 2.

WITNESSES

INVENTOR
H. C. Shaw
by F. N. Barber
Attorney

UNITED STATES PATENT OFFICE.

HENRY C. SHAW, OF GLENSHAW, PENNSYLVANIA, ASSIGNOR TO A. GARRISON FOUNDRY COMPANY, OF PITTSBURGH, PENNSYLVANIA, A CORPORATION OF PENNSYLVANIA.

MECHANICAL MOVEMENT.

1,004,918.  Specification of Letters Patent.  Patented Oct. 3, 1911.

Application filed November 14, 1910. Serial No. 592,183.

*To all whom it may concern:*

Be it known that I, HENRY C. SHAW, a citizen of the United States, residing at Glenshaw, in the county of Allegheny and State of Pennsylvania, have invented new and useful Improvements in Mechanical Movements, of which the following is a specification.

My invention relates to means for causing disengaged gearing to reëngage or mesh without appreciable noise, or shock to the gear teeth and parts associated therewith. In many instances, it is customary to have interrupted or mutilated gearing which permits one member to continue its movement while the other member remains at rest. When the members are again reëngaged so as to cause one to drive the other, the moving member engages the member at rest which owing to the weight and consequent high value of its inertia of rest, produced a violent shock or strain on the gear teeth and the driving and driven mechanism, sometimes breaking the teeth or other part of the mechanism and always causing a considerable noise.

It is the object of the present invention to cause the reëngagement of disconnected gearing to be effected without appreciable shock or strain and without undue noise.

Figure 1:
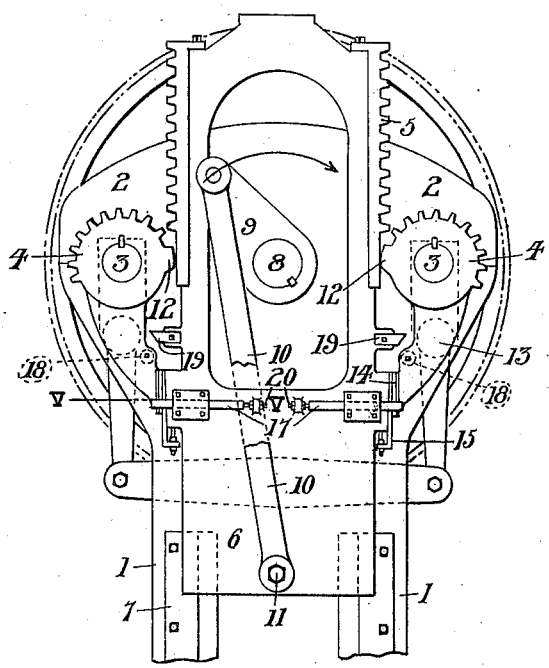
Figure 5:
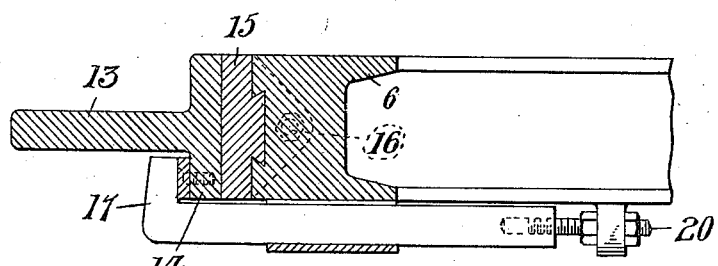
Figure 6:
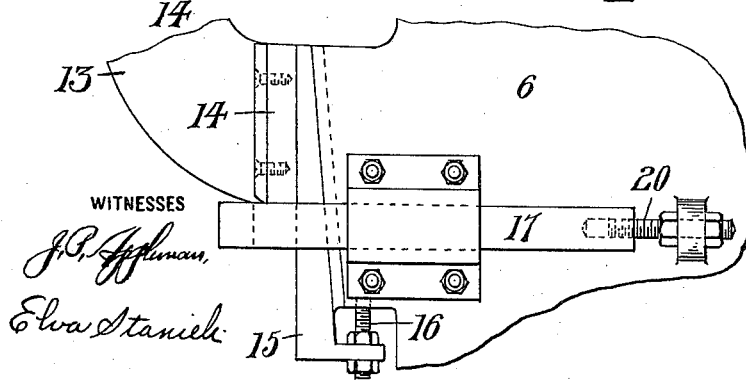
Figure 2:
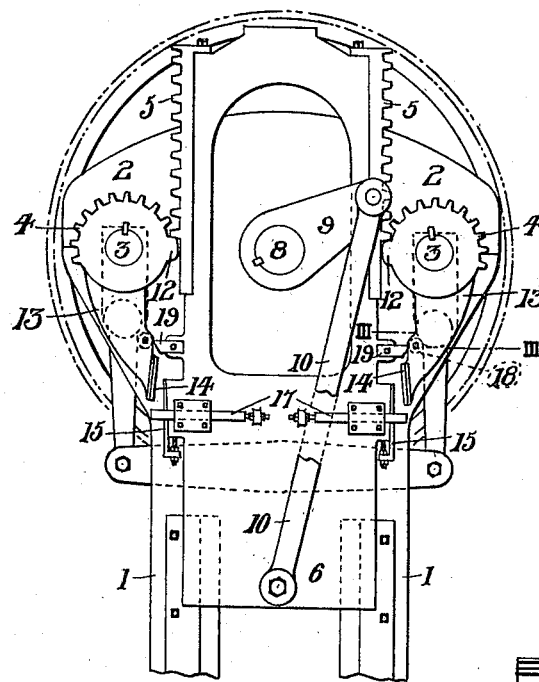
Figure 3:
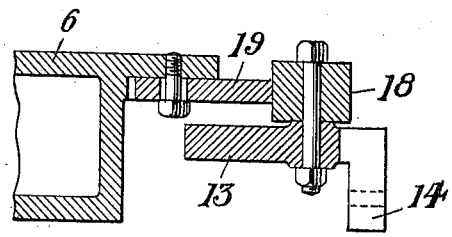
Figure 4:
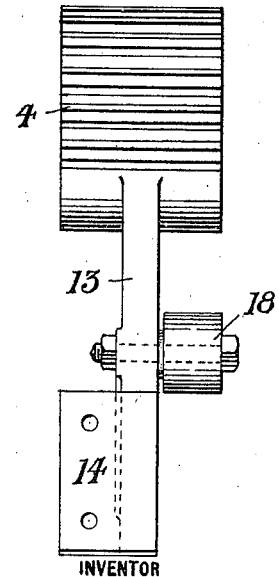

Referring to the accompanying drawings, Figure 1 is a side elevation of such portion of a machine as contains the present invention, the parts being in the position they assume after disengagement of the coöperating gearing. Fig. 2 is a similar view showing the position of the same parts at the moment when the gearing reëngages. Fig. 3 is a section on the line III—III, Fig. 2. Fig. 4 is an elevation of the mechanical element which has periods of rest. Fig. 5 is a section on the line V—V, Fig. 1. Fig. 6 is a side elevation of Fig. 5.

1 designates the upper end of the framework, to opposite sides of which are secured the brackets 2, having at their upper ends bearings for the horizontal parallel shafts 3. These shafts may be connected so as to operate any device, as a clamp for sheet metal, which is required to have a dwell or period of rest while another element, as a drawing die, is operating. I do not limit myself to any particular use for the shafts 3 since they or either of them may actuate a multitude of devices which require actuation during only a portion of the time that another device is operating. The shafts 3 may be termed an actuated element.

The shafts 3 have keyed thereon the half pinions 4, arranged to mesh with the racks 5 on the edges of the vertically reciprocable metal block or carriage 6, slidable in the ways 7 on the frame 1. The shaft 8 driven from any suitable source operates the crank-arm 9, to which is connected the pitman 10, also connected to the carriage 6 by the pin 11.

Fig. 1 shows the carriage 6 nearly at the end of its up-stroke, the teeth of the rack having just passed out of engagement with the last tooth 12 on the pinion 4, leaving the pinion 4 at rest during the remainder of the up-stroke and during that portion of the down-stroke which is required for the bottom rack-tooth to descend into engagement with the tooth 12, this being shown on Fig. 2.

That portion of the half-pinion below the shaft 3 is without teeth and is provided with an arm 13 which has at its free end a flange 14 engaging with the vertically adjustable stop 15 carried by the carriage 6. This stop has a vertical stop-face and an inclined rear face working in an inclined dove-tailed slot in the carriage 6. The vertical adjustment of the stop is secured by the screw 16.

The carriage 6 is provided with horizontal hooks 17 arranged to engage the outer face of the flanges 14 at about the time the teeth become disengaged as shown on Fig. 1 and hold the pinions 4 securely in place where they were left when the disengagement of the teeth occurred. At the time the teeth reëngage the hooks 17 pass below the flanges 14 and leave the pinions 4 free to be actuated by the racks 5 and the means now to be described.

If the racks 5 should engage the teeth 12 while the shafts 3 are at rest, the inertia of rest of the shaft and the parts connected thereto might be so great as to strip the teeth from the rack and pinion, or to cause some part of the mechanism to break. To remedy this defect I have provided a means for causing the shafts 3 to be put into rotation before the teeth of the racks and pinions reëngage. I place on the arms 13 horizontal rollers 18 and on the carriage 6 cams or actuators 19 so located as to engage the rollers just before the teeth reengage and cause the arms 13 to be pushed outwardly, thus setting in rotation the half-pinions 4 at such a speed as to cause the teeth to engage without noise, or appreciable or dangerous shock. The cams 19 are shown as horizontal bars with outer ends beveled downward and inwardly so as to wedge the arms 13 away from the stops 15 as the cams pass the rollers.

The hooks can be adjusted by the screws 20.

I claim—

1. A reciprocating element, a rack thereon, a pinion driven by the rack, the said element reciprocating so as to cause the rack to pass out of engagement with the pinion, an arm movable with the pinion and arranged to be substantially parallel with the rack when the rack is out of engagement with the pinion, and a cam on the reciprocating element arranged to push the arm sidewise to set the pinion in rotation before the rack and pinion reëngage each other.

2. A reciprocating element, a rack thereon, a pinion driven by the rack, the said element reciprocating so as to cause the rack to pass out of engagement with the pinion, an arm movable with the pinion and arranged to be substantially parallel with the rack when the rack is out of engagement with the pinion, a roller on the arm, and a cam on the reciprocating element arranged to engage the roller and push the arm sidewise to set the pinion in rotation before the rack and pinion reëngage each other.

Signed at Pittsburgh, Pa., this 11th day of November, A. D. 1910.

HENRY C. SHAW.

Witnesses:
SUZANNE S. BEATTY,
F. N. BARBER.

Copies of this patent may be obtained for five cents each, by addressing the "Commissioner of Patents, Washington, D. C."